US007143235B1

(12) United States Patent
Watanabe et al.

(10) Patent No.: US 7,143,235 B1
(45) Date of Patent: Nov. 28, 2006

(54) PROPOSED CONFIGURATION MANAGEMENT BEHAVIORS IN A RAID SUBSYSTEM

(75) Inventors: Steven S. Watanabe, San Jose, CA (US); Stephen H. Strange, Mountain View, CA (US); Scott Schoenthal, San Ramon, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 467 days.

(21) Appl. No.: 10/394,855

(22) Filed: Mar. 21, 2003

(51) Int. Cl.
G06F 12/02 (2006.01)
G06F 13/10 (2006.01)

(52) U.S. Cl. .......................... 711/114; 710/8; 711/170
(58) Field of Classification Search ...................... None
See application file for complete search history.

(56) References Cited

U.S. PATENT DOCUMENTS

| 3,876,978 | A | 4/1975 | Bossen et al. |
|---|---|---|---|
| 4,092,732 | A | 5/1978 | Ouchi |
| 4,201,976 | A | 5/1980 | Patel |
| 4,205,324 | A | 5/1980 | Patel |
| 4,375,100 | A | 2/1983 | Tsuji et al. |
| 4,467,421 | A | 8/1984 | White |
| 4,517,663 | A | 5/1985 | Imazeki et al. |
| 4,667,326 | A | 5/1987 | Young et al. |
| 4,688,221 | A | 8/1987 | Nakamura et al. |
| 4,722,085 | A | 1/1988 | Flora et al. |
| 4,755,978 | A | 7/1988 | Takizawa et al. |
| 4,761,785 | A | 8/1988 | Clark et al. |
| 4,775,978 | A | 10/1988 | Hartness |
| 4,796,260 | A | 1/1989 | Schilling et al. |
| 4,817,035 | A | 3/1989 | Timsit |
| 4,825,403 | A | 4/1989 | Gershenson et al. |
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schilling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |

(Continued)

OTHER PUBLICATIONS

U.S. Appl. No. 10/394,810, Scott Schoenthal et al.

(Continued)

Primary Examiner—Gary Portka
(74) Attorney, Agent, or Firm—Cesari and McKenna, LLP (57) ABSTRACT

A technique forecasts the behavior of a RAID subsystem when processing a proposed configuration management request that modifies a topology or attribute configuration, e.g., RAID groups and volume layout, of a storage array managed by the subsystem. In response to the proposed request, the RAID subsystem returns a set of projected result data instead of committing the request to the storage array configuration. An operator issues the proposed request in accordance with a novel view-only mode of a configuration management command. The view-only mode is manifested as an "-n" option that instructs a configuration thread of the RAID subsystem to return pre-committed results without actually committing the modification.

31 Claims, 6 Drawing Sheets

U.S. PATENT DOCUMENTS

| | | | |
|---|---|---|---|
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,963,962 | A | 10/1999 | Hitz et al. |
| 6,038,570 | A | 3/2000 | Hitz et al. |
| 6,092,215 | A | 7/2000 | Hodges et al. |
| 6,138,201 | A | 10/2000 | Rebalski |
| 6,158,017 | A | 12/2000 | Han et al. |
| 6,223,300 | B1 | 4/2001 | Gotoh |
| 6,330,653 | B1 * | 12/2001 | Murray et al. ............... 711/173 |
| 6,532,548 | B1 | 3/2003 | Hughes |
| 6,542,945 | B1 * | 4/2003 | Koker et al. ................. 710/104 |
| 6,581,185 | B1 | 6/2003 | Hughes |
| 6,751,683 | B1 * | 6/2004 | Johnson et al. ............... 710/16 |
| 6,851,023 | B1 * | 2/2005 | Noya et al. .................. 711/114 |

OTHER PUBLICATIONS

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Anvin, Peter H, "*The Mathematics of Raid 6*," Dec. 2004.

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the 14th VLDB Conference, LA, CA (1988).

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M., et al, Maximizing Performance in a Striped Disk Array, Proc. 1990 *ACM SIGARCH 17th Intern*. Symp. on Comp. Arch., Seattle, WA, May 1990, pp. 322-331.

Chen, Peter M., et al.., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., "*A Comparison of High-Availability Media Recovery techniques,*" in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988.).

Gibson, Garth A., et al., *Failure Correction Techniques for Large Disk Arrays*, In Proceedings Architecture Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, p. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

STORAGESUITE "Performance Without Compromise: The Virtual Storage Architecture,"catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14th VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tekrom—"About RAID 6".

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

\* cited by examiner

PROPOSED CONFIGURATION MANAGEMENT BEHAVIORS IN A RAID SUBSYSTEM

FIELD OF THE INVENTION

The present invention relates to storage systems and, more specifically, to a technique that forecasts the behavior in a RAID subsystem of a storage system.

BACKGROUND OF THE INVENTION

A storage system typically comprises one or more storage devices into which data may be entered, and from which data may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in the context is synonymous with hard disk drive (HDD) or direct access storage device (DASD).

Storage of information on the disk array is preferably implemented as one or more storage "volumes", defining an overall logical arrangement of disk space. The disks within a volume are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information may thereafter be retrieved to enable recovery of data lost when a storage device fails.

In the operation of a disk array, it is anticipated that a disk can fail. A goal of a high performance system is to make the mean time to data loss as long as possible, preferably much longer than the expected service life of the system. Data can be lost when one or more disks fail, making it impossible to recover data from the device. Typical schemes to avoid loss of data include mirroring, backup and parity protection. Mirroring stores the same data on two or more disks so that if one disk fails, the "mirror" disk(s) can be used to serve (e.g., read) data. Backup periodically copies data on one disk to another disk. Parity schemes are common because they provide a redundant encoding of the data that allows for loss of one or more disks without the loss of data, while requiring a minimal number of disk drives in the storage system.

Parity protection is used in computer system to protect against loss of data on a storage device, such as a disk. A parity value may be computed by summing (usually modulo 2) data of a particular word size (usually 1 bit) across a number of similar disks holding different data and then storing the results on the disk(s). That is, parity may be computed on 1-bit wide vectors, composed of bits in predetermined positions on each of the disks. Addition and subtraction on 1-bit vectors are an equivalent to exclusive-OR (XOR) logical operations; these addition and subtraction operations can thus be replaced by XOR operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the results from the stored parity.

Typically, the disks are divided into parity groups, each of which comprises one or more data disks and a parity disk. The disk space is divided into stripes, with each stripe containing one block from each disk. The blocks of a stripe are usually at equivalent locations on each disk in the parity group. Within a stripe, all but one block contain data ("data blocks") with the one block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system typically includes a RAID subsystem that manages the storage and retrieval of information to and from the disks of a storage array in accordance with input/output (I/O) operations. In addition, the storage operating system includes administrative interfaces, such as a user interface, that enable operators (system administrators) to access the system in order to implement, e.g., configuration management decisions. Configuration management in the RAID subsystem generally involves a defined set of modifications to the topology or attributes (i.e., configuration) associated with a storage array, such as a disk, a RAID group, a volume or set of volumes. Examples of these modifications include, but are not limited to, disk failure handling, volume splitting, volume online/offline, changes to (default) RAID group size or checksum mechanism, and disk addition.

Typically, configuration management requests are issued through a user interface oriented towards operators that are knowledgeable about the underlying physical aspects of the system. That is, the interface is often adapted towards physical disk structures and management that the operators may manipulate in order to present a view of the storage system on behalf of a client. Often, it is desirable to know the outcome of a proposed configuration operation prior to issuing a configuration management request and being forced to live with the results. For example, it is desirable to understand disk allocation and placement decisions that will be made by the RAID subsystem when a request is made to add one or more disks to a volume. Once the disks have been added to the volume, it is difficult to "undo" the addition without taking drastic measures.

SUMMARY OF THE INVENTION

The present invention overcomes the disadvantages of the prior art by providing a technique for forecasting the behavior of a RAID subsystem when processing a proposed configuration management request that modifies a topology or attribute configuration, e.g., RAID groups and volume layout, of a storage array managed by the subsystem. In response to the proposed request, the RAID subsystem returns a set of projected result data instead of committing the request to the storage array configuration. An operator (user) issues the proposed request in accordance with a novel view-only mode of a configuration management command. The view-only mode is manifested as an "-n" option that instructs a configuration thread of the RAID subsystem to return pre-committed results without actually committing the modification.

The inventive technique takes advantage of transactional semantics associated with configuration management in the RAID subsystem to allow an operation to proceed to a pre-committed state containing result data. The result data is copied for a response to the user prior to destroying (aborting) the pre-committed state. Specifically, the result data is returned to the user as a proposed configuration response on a command line or other encapsulated form of the original request that can be reissued upon confirmation by the user. The user then views the results (which may be integrated with graphical management applications) for acceptance and/or a likelihood of committing the proposed response to the storage array configuration. Alternately, the user may make changes in the results and issue a new proposed request to the configuration thread.

Advantageously, the inventive technique utilizes transaction semantics to allow a proposed operation to complete without intricate special casing of the behaviors. The present invention also provides benefit to system operators/users, allowing for iterative configuration proposals. Moreover, the inventive technique avoids "back-out" scenarios associated with committing sub-optimal or undesired disk placement decisions.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
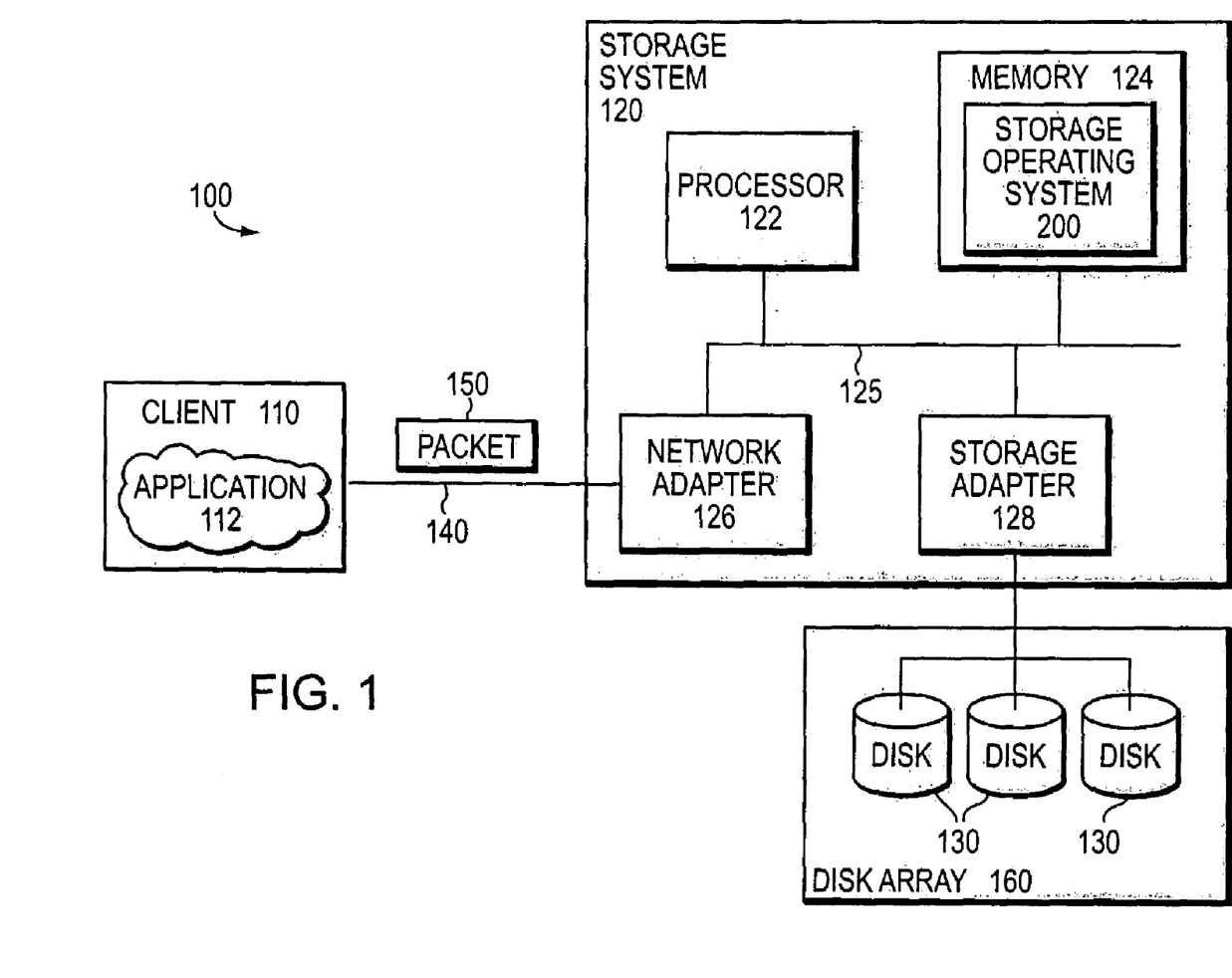
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a file system to logically organize the information as a hierarchical structure of directories, files and virtual disks (hereinafter "blocks") on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (VBN) space on the volume(s). Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. Although a RAID-4 level implementation is illustratively described herein, it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system including, for example, a write in-place file system may be enhanced for use in accordance with the inventive principles described herein. As such, where the term "WAFL" is employed, it should be taken broadly to refer to any storage operating system that is otherwise adaptable to the teachings of this invention.

Figure 2:
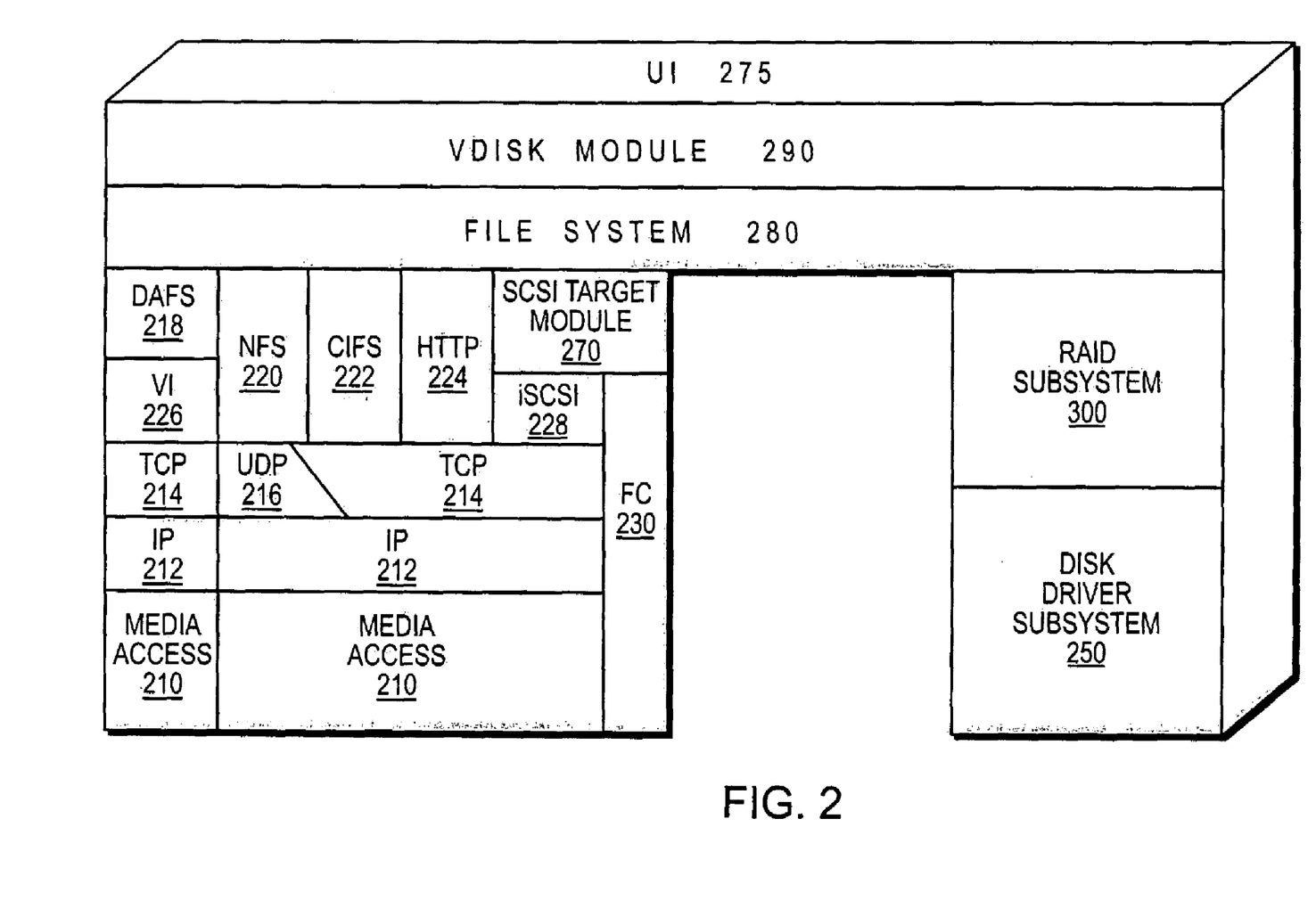
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage device manager embodied as a RAID subsystem 300 that manages the storage and retrieval of information to and from the volumes/disks in accordance with I/O operations, and a disk driver subsystem 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to various layers and subsystems, such as the RAID subsystem 300.

The file system is illustratively a message-based system that provides volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system having an on-disk format representation that is block-based using, e.g., 4 kilobyte (kB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it onto a network protocol and file access layer for additional processing prior to forwarding to the file system layer 280. Here, the file system generates operations to load (retrieve) the requested data from disk 130 if it is not resident "in core", i.e., in the memory 124. If the information is not in memory, the file system 280 indexes into the inode file using the inode number to access an appropriate entry and retrieve a logical VBN. The file system then passes a message structure including the logical VBN to the RAID subsystem 300, which maps that logical number to a disk block number (DBN) and sends the latter to an appropriate driver (e.g., SCSI) of the disk driver subsystem 250. The disk driver accesses the DBN from disk 130 and loads the requested data block(s) in memory 124 for processing by the storage system. Upon completion of the request, the storage system (and operating system) returns a reply to the client 1110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system," generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
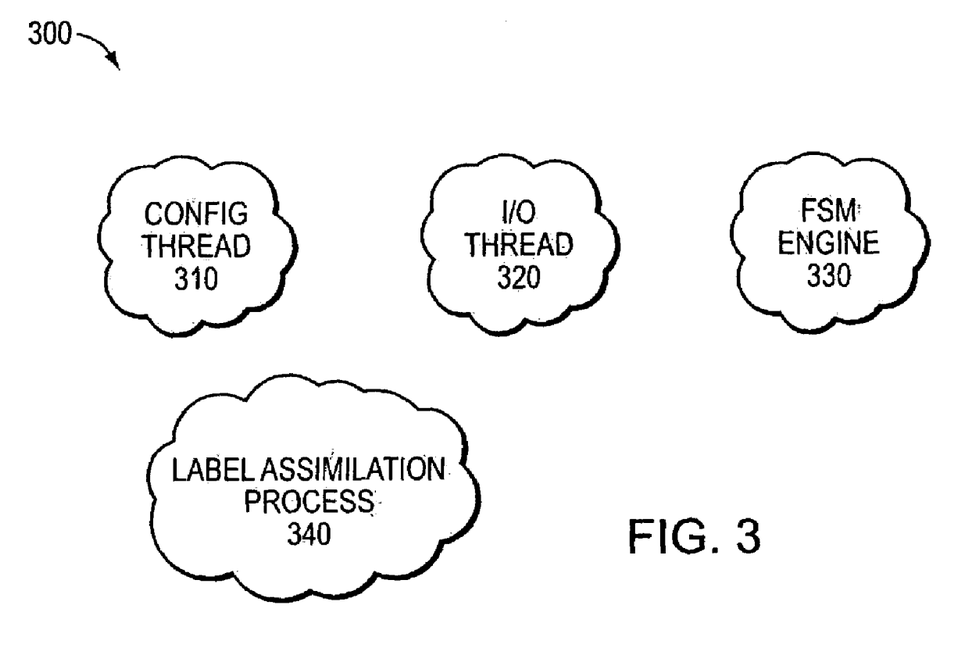
FIG. 3 is a schematic block diagram illustrating processes and threads of a RAID subsystem of the storage operating system of FIG. 2.

The present invention is implemented in the context of a configuration management framework used to implement the RAID subsystem 300 in the storage operating system 200. In a preferred embodiment, the configuration management framework provides an object-oriented approach to RAID configuration management, as described herein with respect to an implementation of the RAID subsystem. FIG. 3 is a schematic block diagram illustrating one or more modules or processes and threads of the RAID subsystem 300, wherein each process has, among other things, a (virtual) memory address space, executable code and data. A process is started with a single thread, but can create additional threads from any of its threads. The threads execute in the same memory address space and can therefore work concurrently on shared data. For example, an instantiator module implements a configuration (config) thread 310 adapted to maintain relationships among and invoke behaviors of decomposed software components ("RAID objects") that collectively form the behaviors associated with a collection of (RAID) volumes on the storage system. In addition, an I/O manager module implements an I/O thread 320 configured to issue I/O transaction requests from the RAID subsystem to the disk driver subsystem and, upon completion, process the results.

A finite state machine (FSM) module or engine 330 is used to arbitrate a set of events and states that a process or thread of the RAID subsystem may encounter. Transactional semantics isolate the behavior of state changes in the RAID subsystem from concurrent I/O operations. The framework provides a two-phase commit procedure, coordinated with updates to on-disk configuration data ("labels"). Errors during disk label updates are handled by aborting the transaction, releasing partially committed data and unwinding any pending state transitions. A state notification mechanism integrated with the FSM engine 330 propagates state changes through the threads in order to provide a coordinated behavior.

According to the configuration management framework, a volume comprises the aggregate behavior of a number of RAID objects. Each RAID object ("object") comprises operational code and static state, such as configuration information, relating to the topology of the underlying physical storage devices, e.g., disks 130, contained in disk array 160. The objects are organized into a configuration tree with configuration interfaces defining a set of services provided by one or more processes of the RAID subsystem. Although the objects may be implemented in accordance with an object-oriented programming paradigm, the present invention is not limited to such an implementation. More broadly, the objects of the configuration tree refer to abstract entities representing a logical combination/configuration of the disks. That is, the objects are used to present a view of the underlying topology of the storage array managed by the RAID subsystem.

Figure 4:
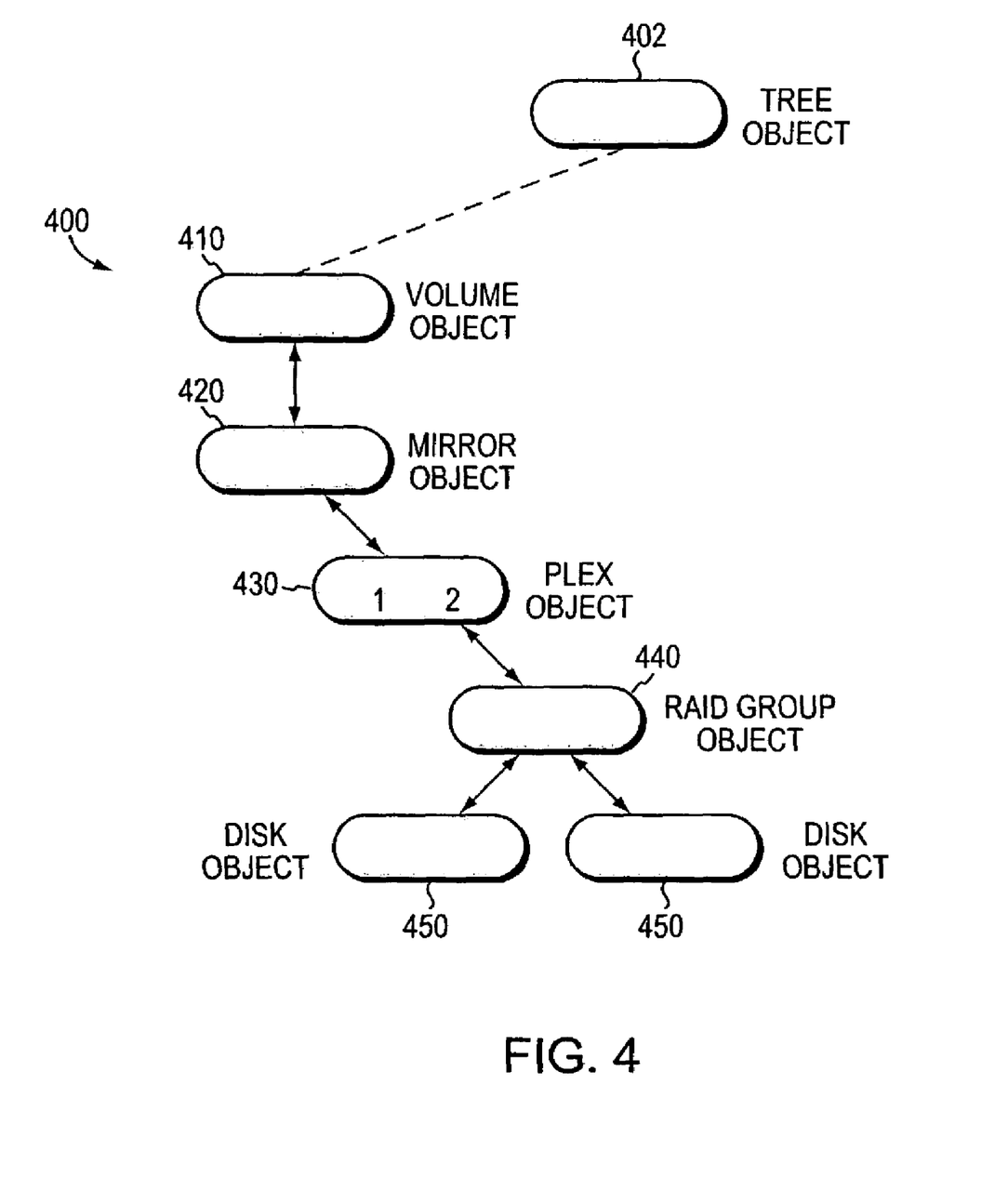
FIG. 4 is a schematic block diagram of an in-core representation of an embodiment of a RAID configuration tree in accordance with a configuration management framework that may be advantageously used with the present invention.

FIG. 4 is a schematic block diagram of an in-core representation of an embodiment of a RAID configuration tree structure 400 in accordance with the configuration management framework. The configuration tree 400 comprises a plurality of objects arranged by the RAID subsystem into levels that cooperate to organize one or more physical disks into a single logical volume. References between objects (e.g., between a superior "parent" object and each of its subordinate "children" objects) are bi-directional memory address pointers that enable each child to reference its parent (and vice versa). These pointers are part of the metadata stored within each of the objects.

Objects have an associated type, with each object type providing its own implementation of the configuration interfaces. A volume is organized into a hierarchical configuration tree of objects that includes a tree object 402 responsible for coordinated behavior with the file system and a volume object 410 responsible for managing the RAID aspects of volume management. Specifically, the volume object 410 represents the (WAFL) file system at the highest level (i.e., root node) of the configuration tree 400. To that end, the volume object 410 stores metadata that describes a volume/file system, wherein the metadata includes information such as the name of the volume and address range (in physical blocks) of the volume. The name of the volume resides in a volume namespace that is exported by the UI 275 of the storage operating system 200. The logical address space of the file system is mapped to the physical (block) address space in the RAID subsystem 300.

The configuration tree 400 and, in particular, the volume object 410 represent a logical disk that is presented to the file system by the RAID subsystem as a "container" for the file system to store its data. That is, the objects of the configuration tree are organized to create an address space that resembles a single logical disk but, in reality, comprises a plurality of physical disks. In this context, the volume object 410 is equivalent to the tree object 402, wherein the tree object stores additional metadata about the logical volume that is presented to the file system. This additional metadata includes the type (level) of parity implementation configured for the particular volume (e.g., RAID-4, RAID-0, mirror_RAID-4, mirror RAID-0, row-diagonal parity). Since the tree object is a one-to-one representation of the volume, the additional metadata stored in the tree object includes redundant information about the volume, such as its name and physical address/block range.

A next object level comprises a mirror object 420 that is responsible for coordinating one or more copies of the volume (termed "plexes") in support of data mirroring. In synchronous data mirroring, two "mirror" copies are provided that are at all times synchronized. That is, changes to the data in one mirrored copy are immediately reflected in the other mirrored copy. The two identical mirrored copies have matching address spaces that are within the volume address space and that provide identical synchronized full copies of the data in the volume.

A plex object 430 is responsible for managing an instance of a copy of volume data and thus represents each mirrored copy within another object level of the configuration tree. Whereas the mirror object 420 stores metadata that is used to coordinate one or more copies (or plexes) of the volume in support of data mirroring, each plex object 430 stores metadata that is used to manage an instance of a copy of volume data. The plex object may include an ordinal placement (e.g., 1, 2) indicating that, for example, a first part (1) of the address space is associated with a particular RAID group and that a second part (2) of the address space is associated with another RAID group.

A next object level comprises one or more RAID group objects 440 per plex object. Each RAID group object 440 contains metadata that provides data protection and I/O coordination over a set of disks. The metadata of the RAID group object includes information such as the number of disks within the RAID group and the address (block) range of each disk within the RAID group. In this context, a RAID group is defined as a number of disks and the address/block space associated with those disks. Finally, there is another object level comprising one or more disk objects 450 per RAID group object, wherein each disk object 450 contains metadata that provides data access to the physical disks 130.

The configuration tree 400 is constructed in the memory 124 of the storage system 120 by a label assimilation process 340 of the RAID subsystem 300. According to the assimilation process, each disk associated with a volume includes a disk label structure that describes its placement and association with that volume. The on-disk label is, in essence, self-describing information for each disk that is actively attached to the storage system 120. The labels are used to dynamically assemble the disks into a volume and to construct an in core configuration tree 400 for that volume, starting from the disk object level up to the volume object level. Therefore, a label on a disk identifies that disk's participation in a RAID group and, furthermore, that group's association with plex, mirror and, ultimately, volume objects in the configuration tree. The label is located in a well-known location of the disk so that it can be queried by the RAID subsystem in accordance with, e.g., a discovery process during a boot operation.

Each object type instance of the configuration tree 400 comprises the following components: service interfaces, committed transactional state, pre-committed transactional state and non-transactional state. The service interfaces comprise an application programming interface (API) that the object exports to other software components. In the illustrative embodiment, the service interfaces include initialization and destruction, child object management (add, replace), online/offline, transaction management (join, commit, abort, label I/O, state change notify), virtual block management, and I/O handling (context creation/deletion, resource management, I/O throttling). Each object type defines the commit, pre-committed, and non-transactional state that it holds. The transaction management interfaces are provided as a mechanism to create and modify transactional state in a manner that is coordinated across all objects in a volume.

The basic flow of control starts with a configuration management operation issued by, e.g., the file system 280 and received by the RAID subsystem 300. The file system passes the configuration management operation in the form of a message request that specifies a target volume and defines a named operation with specific parameters. The configuration thread 310 of the RAID subsystem receives the request and determines the object (e.g., volume, RAID group) of the configuration tree 400 for the volume to which the request is directed. The configuration thread then locates the tree object 402 for the volume and invokes relevant configuration operations using service interfaces of the appropriate object. When a service interface is invoked, the object is transparently "joined" to the request prior to activation of the interface. Joining of an object to a request results in copying of the currently committed state into a pre-committed state area (called the "trans" area of the object). The trans area is a portion of memory that records changes to the object that are pending commitment. The service interface makes its changes to the trans area. If the changes to the object result in a change of the state of the object, the FSM engine 330 is invoked.

The FSM engine 330 provides a critical component in managing the interrelationship between objects in a RAID volume. Specifically, the FSM engine defines the state/event pairs that are "legal" and, for each state/event, provides a mechanism to implement the invocation and determine any subsequent state transitions. In addition, the FSM engine provides tracing mechanisms to track the set of transitions that have occurred and provides object notification for pre-committed and committed state transitions. More specifically, the FSM engine 330 is responsible for determining the new state of the object (based upon a per object type state/event table) and invoking the state notification interface of its "superior" object in the volume hierarchy. The FSM engine includes an upward notification mechanism (e.g., from child to parent object) to notify the parent object about a state change in the child object.

When the configuration request completes all service interface invocations, it requests a label commit operation to persistently store the modified state. The label commit "pulls" data from the trans area in order to construct its new version of the label data. Label commit is deemed to be successful only if all labels in a plex can be successfully written. Once all labels have been successfully written, each object that has been joined to the request is responsible for copying its trans area data back to the committed state portion of the object. If labels are not successfully written, the trans area is discarded, any disk failures are identified and resulting configuration changes are initiated, the successfully written labels are re-written with the previous state, and the original configuration request is retried.

In the illustrative embodiment, there are several configuration management commands that are used to modify the topology or attribute configuration associated with a storage array, such as a disk, a RAID group, a volume or set of volumes. These configuration commands include, but are not limited to, create volume, create plex, add disks and split volume. The configuration management commands are entered into the storage system 120 by a user (operator) through, e.g., a command line interface (CLI) or similar administrative interface of the UI 275 to thereby effect configuration changes to the underlying topology configuration of the storage devices (disks 130). For example, creation of a volume is effected by the operator entering a vol create CLI command that forms a configuration tree in memory 124 of the storage system. The format of the vol create CLI command is illustratively:

vol create foo 6 wherein vol create denotes the volume create operation specified in the command, foo is the name of the new volume and 6 is the number of disks to be contained in that new volume. In response to the vol create CLI command, the RAID subsystem allocates 6 spare disks and organizes them into a new volume or file system called foo. In other words, the RAID subsystem selects 6 disks from a spare pool and, for a RAID-4 level implementation, converts those 6 disks from spare types to five data disk types and one parity disk type. The selection and conversion of spare disks to data/parity disks is performed in accordance with a disk addition technique, an example of which is described in U.S. patent application Ser. No. 10/394,810 titled Technique for Managing Addition of Disks to a Volume of a Storage System, which application is hereby incorporated by reference.

However, the user is unaware as to exactly which disks are selected by the RAID subsystem in connection with the disk addition technique when responding to the vol create command. If the user wants to specify the exact disks to be selected, a -d option is provided in connection with the vol create CLI command. Yet, if the user has no knowledge of the types of disks in the spare pool, it would be desirable to allow the RAID subsystem to select the disks, while still having an understanding of what disks will be selected before actually committing the operation to the RAID subsystem.

According to the present invention, a technique is provided that forecasts the behavior of the RAID subsystem when processing a proposed configuration management request that modifies a topology or attribute configuration, e.g., RAID groups and volume layout, of the storage array managed by the subsystem. As noted, examples of configuration management command requests that support the novel view-only mode are create volume, create plex and add disks. In response to the proposed request, the RAID subsystem returns a set of projected result data instead of committing the request to the storage array configuration. An operator (user) may issue the proposed request in accordance with a novel view-only mode of a configuration management command. The view-only mode is manifested as an "-n" option that instructs the configuration thread of the RAID subsystem to return pre-committed results without actually committing the modification.

The inventive technique takes advantage of transactional semantics associated with configuration management in the RAID subsystem to allow an operation to proceed to a pre-committed state containing result data. The result data is copied for a response to the user prior to destroying (aborting) the pre-committed state. Specifically, the result data is returned to the user as a proposed configuration response on a command line or other encapsulated form of the original request that can be reissued upon confirmation by the user. The user then views the results (which may be integrated with graphical management applications) for acceptance and/or a likelihood of committing the proposed response to the storage array configuration. Alternately, the user may make changes in the results and issue a new proposed request to the configuration thread.

The -n option associated with the configuration management CLI command instructs the configuration thread to return pre-committed results without actually committing the change. That is, the -n option enables a user to determine what would have been done in response to a CLI command for a configuration operation without actually performing (committing) that operation to the subsystem. For example, in response to the user entering the command vol create foo 6 -n at the UI 275 of the storage system, the RAID subsystem returns the following information to the user:

vol create foo 6 -d 7a.1, 7a.2, . . .

wherein the parameters 7a.1, 7a.2, . . . indicate disk names for the selected disks within disk shelves attached to the storage system. In essence, the RAID system cooperates with the UI to display a command line indicating a proposed configuration change in response to the CLI command.

The -n option of a CLI command is a feature of the configuration management framework of the RAID subsystem. It should be noted that an -n flag is used in connection with a make command associated with compiler management in UNIX operating system environments. The conventional compiler management make command is used to keep track of changes/updates to source files in a UNIX operating system so as to only compile those files that have changed. The technique of the present invention extends the utility of configuration management framework in the RAID subsystem by providing the -n option for use with configuration management operations issued to RAID subsystem.

Figure 5:
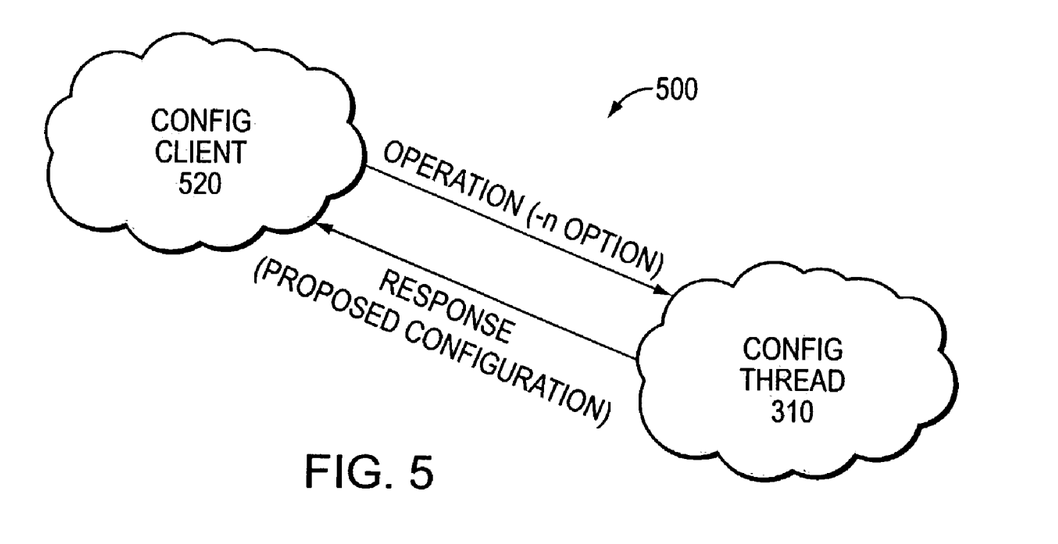
FIG. 5 is a schematic block diagram illustrating the interaction between a configuration client and configuration thread when invoking a -n option of the present invention.

In the illustrative embodiment, the configuration thread 310 interacts with a configuration client of the UI 275 to provide support for the view-only request/response model. FIG. 5 is a schematic block diagram illustrating the interaction 500 between the configuration client 520 and the configuration thread 310 when invoking the -n option of the present invention. The configuration client 520 is responsible for interpreting a CLI command entered by a user into the UI 275. In particular, the configuration client 520 parses the CLI command text into various parameters that are converted into a message and passed to the configuration thread 310. The message comprises a proposed configuration management operation with a setting of "view-only" (i.e., the -n option). Note that the configuration client includes code that distinguishes various CLI commands with respect to issuing messages to either the RAID subsystem 300 or file system 280 of the storage operating system 200. The configuration thread performs the proposed operation and loads pre-committed state changes as result data into a per transaction buffer of memory 124. The result data are copied into a configuration response buffer of the memory and the proposed operation is aborted, resulting in releasing of the pre-committed state.

For example, in the case of the vol create command, the configuration client 520 passes the following pairs of parameters to the configuration thread 310:

vol name=foo;

number of disks=6; and commit=no.

wherein the commit parameter is an indication of the -n option. All of these parameters are "marshaled" (assembled) into a message and passed to the configuration thread. The configuration thread then processes the parameters by, e.g., selecting 6 spare disks in accordance with criteria of a disk selection/placement policy.

Once processing of the parameters is completed, the configuration thread 310 returns a proposed configuration change response to the configuration client 520 instead of committing the operation. The proposed configuration change may include the names of the requested disks or, possibly, a failure indication if the selection/placement criteria cannot be met. For example, if the RAID subsystem can only select five disks instead of six disks, a failure indication (rather than a proposed configuration change) may be returned to the client for display to the user. This aspect of the present invention provides the user with more information and flexibility when determining an outcome of an operation without actually committing that operation to the system.

Another example of a CLI configuration command used to add disks to a volume is the vol add command, the format of which is illustratively:

vol add foo 1 wherein foo specifies the name of the existing volume and 1 indicates the number of disks that are added to the existing volume. Therefore, the vol add command adds one disk to the existing volume foo.

In general, once a disk is added to a volume, there is no easy way to remove (delete) that disk. A typical solution is to copy the data onto a smaller volume (minus the particular disk) and then destroy the old volume. Clearly, this is a time and resource consuming process. Use of the novel -n option gives a user an indication as to which disk would be used/selected by the RAID subsystem when adding a disk to the existing volume. If the selected disk is unacceptable to the user, then the user can utilize the vol add command with, e.g., the -d option specifying the particular disk to be added to the volume. When utilizing the -d option, the user is substituting his knowledge for an elaborate disk selection/placement policy executed by the RAID subsystem of the storage system.

Another example of a CLI command that supports the -n option is a command directed to creating a plex. Creation of a plex denotes that it is desirable to create a mirrored volume from an existing unmirrored volume. The format of the CLI command directed to creating a plex is:

vol mirror foo wherein foo denotes the name of the existing unmirrored volume. With reference to configuration tree 400, the vol mirror foo command creates a second plex object and a second RAID group object, and then selects two disks for placement into that second RAID group. Note that the number of disks does not have to be specified in the vol mirror command because that parameter is dictated by the number of disks that are in the first plex of the unmirrored volume. The vol mirror command is thus another example of a spare disk selection command that accepts the -n option, along with the -d option specifying a list of desired disks. In this respect, the vol mirror CLI command is similar to the vol create CLI command.

Advantageously, the -n option saves time and resources if unexpected results are returned in response to a particular CLI command. That is, if the user did not specify the -n option as part of, e.g., the vol create CLI command and thereafter does not agree with the disks chosen by the RAID subsystem, a relatively time and resource consuming process is needed to "back-out" from this configuration change. Specifically, the volume would have to be "destroyed" and then recreated using, e.g., the -d option specifying the exact disks desired. Once the volume is destroyed, those disks in that volume become non-zeroed spares that have to be zeroed in accordance with a time consuming zeroing process.

Figure 6:
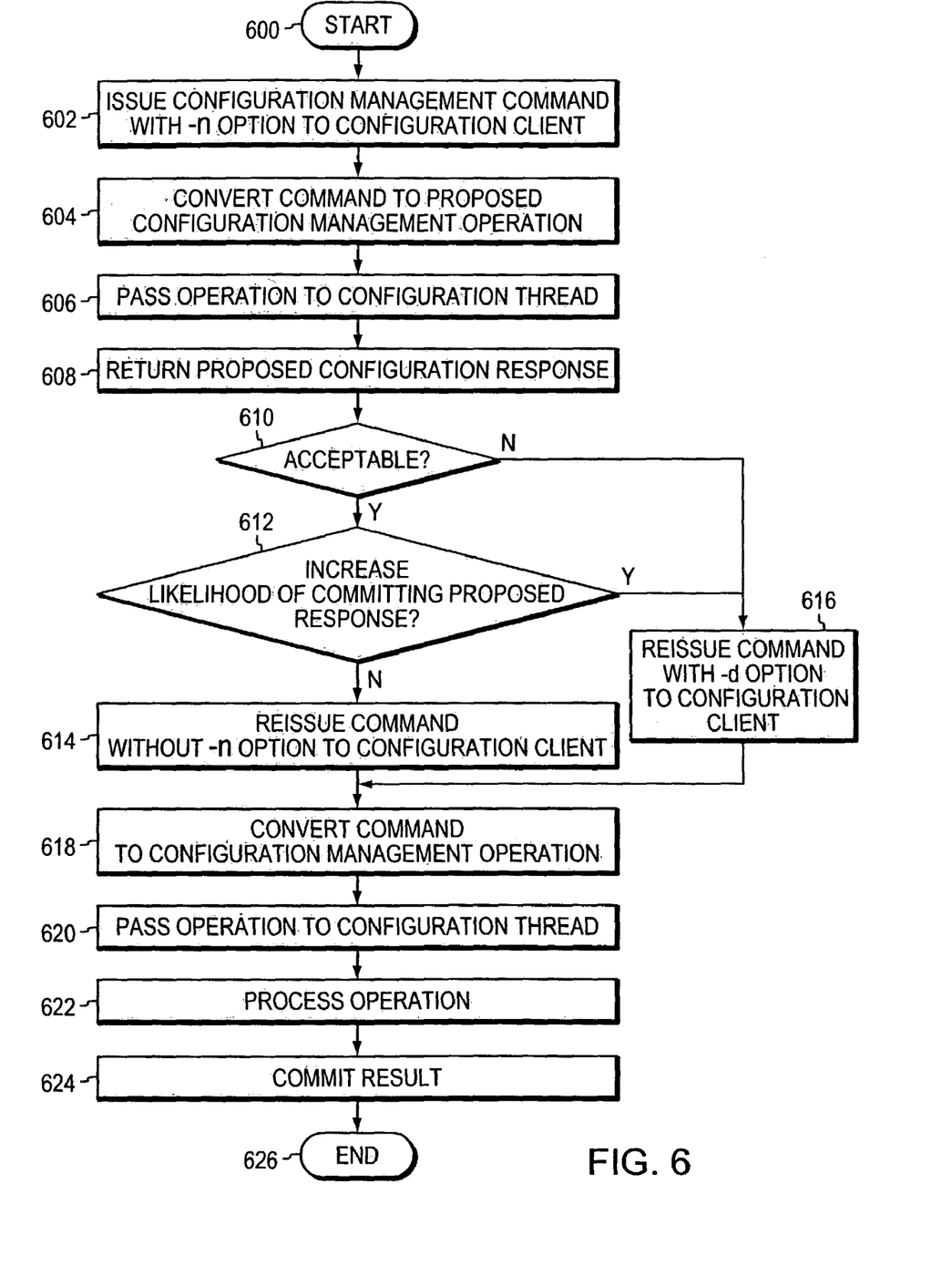
FIG. 6 is a flowchart illustrating a sequence of steps for forecasting the behavior of a RAID subsystem when processing a proposed configuration management request in accordance with the present invention.

FIG. 6 is a flowchart illustrating a sequence of steps for forecasting the behavior of a RAID subsystem when processing a proposed configuration management request that modifies the topology or attributes of the storage array managed by the subsystem. The sequence starts at Step 600 and proceeds to Step 602 where a user issues a configuration management CLI command with the don't commit (-n) option to the configuration client of the UI. At Step 604, the configuration client converts the command into a proposed configuration management operation and passes the operation to the configuration thread at Step 606. The configuration thread performs the operation and, instead of committing that operation, returns a proposed configuration response to the configuration client at Step 608. As noted, the response indicates the likely outcome (proposed results) of the operation specified by the CLI command. At Step 610, a determination is made as to whether the response (a proposed configuration change) is acceptable to the user. If so, a determination is made as to whether the user wants to increase the likelihood of committing the proposed results (Step 612).

Here it should be noted that there is a discrete period of time between return of the response and issuance of a subsequent command; it is possible that the proposed configuration change may be altered because of intervening events during that time period. Assuming nothing changes in the interim, the same result is achieved; yet as noted above, the possibility of the same result occurring is not guaranteed. If he decided not to increase the likelihood of committing the proposed results, the user reissues the CLI command without the -n option at Step 614.

However, to increase the likelihood that the same results are achieved or, alternatively, if the proposed configuration response is not acceptable (Step 610), the user reissues the CLI command with the -d option at Step 616, wherein the -d option enables the user to specify either the proposed configuration changes included in the response or his own details of the configuration management command. For example, if the vol create foo 6 -n CLI command results in a response that proposes a set of disks acceptable to the user, then the user may issue a vol create foo 6 -d CLI command that specifies those disk names returned in the proposed configuration response. As noted, this feature of the invention saves time and resources if an unexpected result is instituted by the RAID subsystem. In any event, the configuration client converts the command to a configuration management operation in Step 618 and passes the operation to the configuration thread at Step 620. In Step 622, the configuration thread processes the operation and commits the result at Step 624. The sequence then ends at Step 626.

While there has been shown and described an illustrative embodiment for forecasting the behavior of a RAID subsystem when processing a proposed configuration management request that modifies the topology or attributes of a storage array managed by the subsystem, it is to be understood that various other adaptations and modifications may be made within the spirit and scope of the invention. For example, although the illustrative embodiment has described specific CLI commands that may be used with the -n option, it is understood that the novel -n option may be used with other CLI commands supported by the storage system. Moreover, the configuration client 520 of the UI may have additional functionality to that of a CLI command text parser; that is, the configuration client may be embodied as a graphical user interface (GUI) that displays a proposed configuration change in graphical (rather than textual) form.

A preferred embodiment of the invention has been described herein with reference to a file server having a storage operating system with a file system layer and a RAID subsystem (among other components), which manages file semantics in order to access data organized in files. It should be understood, however, that the invention can be practiced in any system or device that forecasts the behavior of a RAID subsystem, particularly in light of configuration management changes. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files or in another manner. Moreover, such systems and devices may or may not incorporate features and functions described herein, such as, for example, a file system layer or a RAID subsystem, or may combine or otherwise modify their operation, without departing from the principles of the invention. Finally, the invention has been described herein using nomenclature such as "-n option" which may appear to be specific to implementations of the invention providing RAID functionality; however, the invention in its broader sense is not so limited.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for forecasting a behavior of a storage subsystem when processing a proposed configuration management request that modifies a topology or attribute configuration of a storage array coupled to a storage system, the method comprising the steps of:
   issuing a configuration management command to add one or more disks to the storage array in a view-only mode, the configuration management command entered through a user interface of a storage operating system executing on the storage system; and
   returning a set of projected result data instead of committing the command to modify the storage array configuration.

2. The method of claim 1 further comprising the step of, in response to the step of issuing, instructing the storage subsystem to return the set of projected data without committing the modification to the storage array configuration.

3. The method of claim 2 wherein the step of returning comprises the step of returning the result data as a proposed configuration response on a command line that can be reissued upon confirmation of the response.

4. The method of claim 3 further comprising the step of viewing the result data for acceptance and likelihood of committing the proposed configuration response to the storage array configuration.

5. The method of claim 3 further comprising the steps of:
   making changes to the result data; and
   reissuing a new configuration management command.

6. A system adapted to forecast a behavior of a storage subsystem when processing a proposed configuration management request that modifies a topology or attribute configuration of a storage array coupled to a storage system, the system comprising:
   a user interface having a configuration client configured to enter a configuration management command to add one or more disks to the storage array including a plurality of disks with a view-only mode to create a proposed configuration; and
   a configuration thread configured to perform the proposed configuration and return results of the proposed configuration to the configuration client without committing the results.

7. The system of claim 6 wherein the view-only mode manifests as a command that instructs the configuration thread to return pre-committed results without committing those results.

8. The system of claim 6 wherein one of the plurality of configuration management commands is a vol create command that creates a configuration tree comprising a plurality of objects arranged by the storage subsystem into levels that cooperate to organize one or more disks of the storage array into a volume of the storage array.

9. The system of claim 8 wherein another of the plurality of configuration management commands is a vol add command used to add disks to the volume.

10. The system of claim 9 wherein another of the plurality of configuration management commands is a vol mirror command that creates a plex object of the configuration tree, the vol mirror command denoting that the volume is an unmirrored volume and that the plex object creates a mirrored volume from the unmirrored volume.

11. The system of claim 10 wherein the storage subsystem is a RAID subsystem.

12. The system of claim 6 wherein the storage subsystem is a RAID subsystem.

13. A method for forecasting a behavior of a RAID subsystem when processing a proposed configuration management request that modifies a topology or attribute configuration of a storage array coupled to a storage system, the method comprising the steps of:
   issuing a configuration management command to add one or more disks to the storage array with a pre-commit command to a storage operating system executing on the storage system;
   converting the configuration management command to a proposed configuration management operation for the storage array;
   performing the proposed configuration management operation without committing the operation to the storage array configuration; and
   returning a proposed configuration response to the configuration client, the response indicating proposed results of the issued command.

14. The method of claim 13 further comprising the steps of:
   determining whether the response is acceptable;
   if so, determining whether a user wants to increase a likelihood of committing the proposed results;
   if not, reissuing the configuration management command without the pre-commit command to the storage operating system;
   converting the configuration management command to a configuration management operation;

processing the configuration management operation; and committing the result to the storage array configuration.

15. The method of claim 13 further comprising the steps of:
determining whether the response is acceptable;
if so, determining whether a user wants to increase a likelihood of committing the proposed results;
if so, reissuing the configuration management command with a disk select option to the storage operating system, the disk select option specifying the proposed results included in the response;
converting the configuration management command to a configuration management operation;
processing the configuration management operation; and committing the result to the storage array configuration.

16. The method of claim 13 further comprising the steps of:
determining whether the response is acceptable;
if not, reissuing the configuration management command with a disk select option to the storage operating system, the disk select option specifying details of the configuration management command;
converting the configuration management command to a configuration management operation;
processing the configuration management operation; and committing the result to the storage array configuration.

17. Apparatus for forecasting a behavior of a RAID subsystem when processing a proposed configuration management request that modifies a topology or attribute configuration of a storage array coupled to a storage system, the apparatus comprising:
means for issuing a configuration management command to add one or more disks to the storage array in a view-only mode, the configuration management command entered through a user interface of a storage operating system executing on the storage system; and
means for returning a set of projected result data instead of committing the command to modify the storage array configuration.

18. The apparatus of claim 17 further comprising means for instructing the RAID subsystem to return the set of projected data without committing the modification to the storage array configuration.

19. The apparatus of claim 18 further comprising means for viewing the result data for acceptance and likelihood of committing the proposed configuration response to the storage array configuration.

20. A computer readable medium containing executable program instructions for forecasting a behavior of a RAID subsystem when processing a proposed configuration management request that modifies a topology or attribute configuration of a storage array coupled to a storage system, the executable instructions comprising one or more program instructions for:
issuing a configuration management command to add one or more disks to the storage array in a view-only mode, the configuration management command entered through a user interface of a storage operating system executing on the storage system; and
returning a set of projected result data instead of committing the command to modify the storage array configuration.

21. The computer readable medium method of claim 20 further comprising one or more program instructions for instructing the RAID subsystem to return the set of projected data without committing the modification to the storage array configuration.

22. A method for forecasting a behavior of a storage subsystem when processing a proposed configuration management request, the method comprising the steps of:
issuing a configuration management command for an array of a plurality of disks, the command to add disks to the proposed configuration; and
returning a set of projected result data and not committing the command to add the disks.

23. The method of claim 22 further comprising the steps of:
making changes to the set of projected result data; and reissuing a new configuration management command.

24. The method of claim 22 further comprising the step of: observing the set of projected results in a view-only mode.

25. The method of claim 22 further comprising the step of:
issuing a vol create command that creates a configuration tree comprising a plurality of objects arranged by the storage subsystem into levels that cooperate to organize one or more disks of the storage array into a volume of the storage array.

26. The method of claim 22 further comprising:
issuing a vol add command used to add disks to the volume.

27. The method claim 22 further comprising:
issuing a vol mirror command that creates a plex object of the configuration tree, the vol mirror command denoting that the volume is an unmirrored volume and that the plex object creates a mirrored volume from the unmirrored volume.

28. A method for previewing a volume configuration of a storage subsystem, the method comprising the steps of:
proposing the volume configuration for the storage subsystem;
adding a plurality of disks to the proposed volume configuration; and
reviewing the proposed volume configuration before committing the volume configuration to the storage subsystem.

29. An apparatus for previewing a volume configuration of a storage system, comprising:
means for proposing the volume configuration for the storage subsystem;
means for adding a plurality of disks to the proposed volume configuration; and
means for reviewing the proposed volume configuration before committing the volume configuration to the storage subsystem.

30. A system for previewing a proposed volume configuration of a storage system, comprising:
a user interface configured to enter a configuration management command to add a volume to the storage system; and
an operating system configured to add a plurality of disks to the proposed volume configuration in a view-only mode.

31. A computer readable media
containing instructions for execution on a processor for the practice of the method of previewing a volume configuration of a storage subsystem, comprising:
proposing the volume configuration for the storage subsystem;
adding a plurality of disks to the proposed volume configuration; and
reviewing the proposed volume configuration before committing the volume configuration to the storage subsystem.

* * * * *